United States Patent
Perez

(10) Patent No.: US 6,820,161 B1
(45) Date of Patent: Nov. 16, 2004

(54) MECHANISM FOR ALLOWING PCI-PCI BRIDGES TO CACHE DATA WITHOUT ANY COHERENCY SIDE EFFECTS

(75) Inventor: Michael Anthony Perez, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 489 days.

(21) Appl. No.: 09/671,065

(22) Filed: Sep. 28, 2000

(51) Int. Cl.$^7$ .......................... G06F 13/36; G06F 13/20
(52) U.S. Cl. .................. 710/306; 710/314; 710/313; 710/311
(58) Field of Search ............................. 710/306, 314, 710/300, 311, 313, 315, 312

(56) References Cited

U.S. PATENT DOCUMENTS

| | | | | |
|---|---|---|---|---|
| 4,868,783 | A | * | 9/1989 | Anderson et al. ........... 710/104 |
| 5,768,547 | A | * | 6/1998 | Ezzet .......................... 710/306 |
| 6,338,119 | B1 | * | 1/2002 | Anderson et al. ........... 711/135 |
| 6,421,756 | B1 | * | 7/2002 | Kelley et al. ................ 710/310 |
| 6,449,677 | B1 | * | 9/2002 | Olarig et al. ................ 710/305 |
| 6,477,610 | B1 | * | 11/2002 | Willenborg .................. 710/310 |
| 6,658,599 | B1 | * | 12/2003 | Linam et al. .................. 714/25 |

FOREIGN PATENT DOCUMENTS

| | | | | |
|---|---|---|---|---|
| JP | 05-028095 | 2/1993 | ........... G06F/13/36 |
| JP | 08-036526 | 2/1996 | ........... G06F/12/08 |
| JP | 08-272732 | 10/1996 | ........... G06F/13/28 |
| JP | 10-247172 | 9/1998 | ........... G06F/13/36 |
| JP | 11-015777 | 1/1999 | ........... G06F/13/36 |
| JP | 11-338774 | 12/1999 | ........... G06F/12/08 |
| JP | 2000-003331 | 1/2000 | ........... G06F/13/36 |
| JP | 2000-076179 | 3/2000 | ........... G06F/13/36 |

* cited by examiner

*Primary Examiner*—Tim Vo
(74) *Attorney, Agent, or Firm*—Duke W. Yee; Mark E. McBurney; Patrick C.R. Holmes

(57) ABSTRACT

A method, system, and apparatus for providing data to an I/O adapter from a PCI-to-PCI bus bridge is provided. In one embodiment, once the PCI-to-PCI bus bridge receives a request for data from the I/O adapter, the PCI-to-PCI bus bridge determines whether the requested data is contained within a cached memory within the PCI-to-PCI bus bridge. If the data is contained within the cached memory, then the requested data is provided to the I/O adapter from the cached memory. If the requested data is not within the cached memory, the data is fetched from system memory, then cached in the PCI-to-PCI bus bridge, and sent to the requesting I/O adapter. To ensure that the data in the cached memory within the PCI-to-PCI bridge is not stale, signals are received, periodically or aperiodically, by the PCI-to-PCI bridge from a PCI host bridge indicating whether the data contained within the buffers is stale. If the data is stale, then in some embodiments, the contents of all the buffers are cleared, while in other embodiments, only the contents of the buffers containing data that has been indicated to be stale is cleared.

27 Claims, 3 Drawing Sheets

100 DATA PROCESSING SYSTEM

MECHANISM FOR ALLOWING PCI-PCI BRIDGES TO CACHE DATA WITHOUT ANY COHERENCY SIDE EFFECTS

BACKGROUND OF THE INVENTION

1. Technical Field

The present invention relates to an improved data processing system and, more particularly, to methods of managing bus traffic generated by I/O devices.

2. Description of Related Art

With the recent rapid expansion of the Internet as well as the increased use of networked computers by small, as well as large, businesses, the numbers of computers utilized as servers has increased. A server is a computer within a network that is shared by multiple users. A server may be used, for example, as a file server in a small network allowing access to common files to multiple users within a company, or as a web server providing internet content to numerous users who access the information via the Internet.

Because servers may be accessed by numerous users, servers typically include many input/output (I/O) devices to accommodate these users. In many computers, these I/O devices are connected to a central processor and other system resources within the computer via an I/O adapter connected to a peripheral component interconnect (PCI) bus. The PCI bus is connected to a main system I/O bus via PCI-PCI bridges and PCI host bridges. These bridges include circuitry for placing data from the PCI bus onto the system I/O bus and vice versa. The system I/O bus is shared by numerous I/O adapters to carry data between various system resources, such as, for example, the central processing unit (CPU) or main system memory, and the various I/O devices. However, only one I/O device at a time may utilize the system I/O bus. Therefore, other devices must wait until the system I/O bus is not busy to utilize the system I/O bus.

When data is requested by an I/O device, a PCI to PCI bridge prefetches a certain amount of the requested data to provide for the I/O adapter's buffers. Once this data has been provided to the I/O adapter, the next part of the requested data is prefetched. The amount of data prefetched by the PCI to PCI bridge is fixed and independent of the type of I/O adapter. If the adapter has shallow buffers and the PCI to PCI bridge prefetches more data than the adapter can take in due to insufficient adapter buffer space, then the PCI to PCI bridge is forced to throw away the extra data to avoid coherency issues. Then the adapter may ask for the additional data and the PCI to PCI bridge will have to re-request the data from the PCI Host Bridge (PHB). The PHB may already have the next available piece of data, which it will have to throw away to re-gather the previous data again.

For example, if a PCI to PCI bridge prefetches 512 bytes of data, then the PHB will give the PCI to PCI bridge the 512 bytes of data and then gather another 512 bytes of data in anticipation of a request for the next piece of data. The PCI to PCI bridge gives the data to the adapter, but the adapter only takes 128 bytes because that is the limit of its buffer. The PCI to PCI bridge throws away 384 bytes. The adapter then requests the next 128 bytes of data. The PCI to PCI bridge must then go back to the PHB to request the previous data again. Thus, the PHB has to throw away the next 512 bytes so that it can retrieve the previous data again.

Caching the data in the PCI-PCI Bridge would reduce the amount of fetching data over and over again that generates a great deal of wasted traffic on the system I/O bus thus slowing down the performance of the server. However, current PCI-PCI Bridges can not cache data that it receives from the PCI Host Bridges (PHB) because there are no mechanisms available for the PCI-PCI Bridge to As, determine if the cache data is stale (i.e. system memory has been altered). Thus, any data gathered by a PCI-PCI Bridge must be thrown away after it has been first touched. So, for example, if a PCI-PCI Bridge fetches 512 bytes of data, an adapter only takes 32 bytes of the 512 bytes, and then the adapter requests more of the 512 bytes, the bridge will have to throw out the reset of the 512 bytes of data and refetch it for the next access just in case the data might be stale. The data generally is not stale, but there is currently no mechanism to determine whether the data is stale. This refetching of data causes performance hits (i.e. unnecessary refetching of data and thrashing on the PCI buses). Therefore, a method, system, and apparatus for reducing the amount of traffic on the system I/O bus due to multiple requests of the same data by an I/O adapter would be desirable by caching data in the PCI-PCI bridges.

SUMMARY OF THE INVENTION

The present invention provides a method, system, and apparatus for providing data to an I/O adapter from a PCI-to-PCI bus bridge. In one embodiment, once the PCI-to-PCI bus bridge receives a request for data from the I/O adapter, the PCI-to-PCI bus bridge determines whether the requested data is contained within a cached memory within the PCI-to-PCI bus bridge. If the data is contained within the cached memory, then the requested data is provided to the I/O adapter from the cached memory. If the requested data is not within the cached memory, the data is fetched from system memory, then cached in the PCI-to-PCI bus bridge, and sent to the requesting I/O adapter. To ensure that the data in the cached memory within the PCI-to-PCI bridge is not stale, 2 signals are received, periodically or aperiodically, by the PCI-to-PCI bridge from a PCI host bridge indicating whether the data contained within the buffers is stale. If the data is stale, then in some embodiments, the contents of all the buffers are cleared, while in other embodiments, only the contents of the buffers containing data that has been indicated to be stale is cleared.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
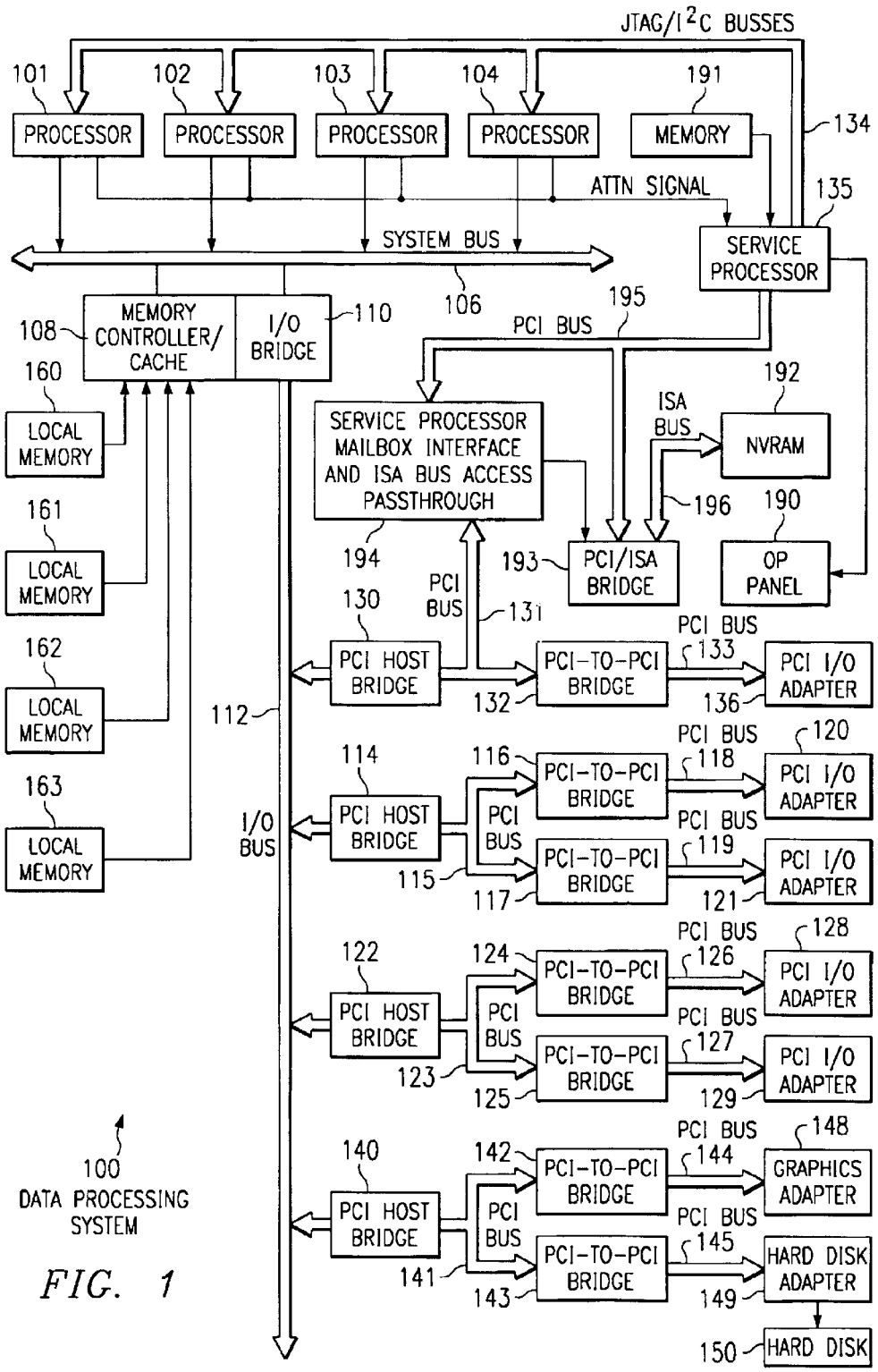
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted. An operating system, such as, for example, the Advanced Interactive Executive (AIX) operating system, a product of the International Business Machines Corporation of Armonk, N.Y., may run on data processing system 100.

Peripheral component interconnect (PCI) Host bridge 114 connected to I/O bus 112 provides an interface to PCI local bus 115. A number of Input/Output adapters 120–121 may be connected to PCI bus 115 through a respective one of PCI-to-PCI bridges 116–117 via a respective one of PCI buses 118–119. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI-to-PCI bridges 124–125 which are in turn each connected to a respective one of PCI I/O adapters 128–129 by a respective one of PCI buses 126–127. Thus, additional I/O devices, such as, for example, modems or network adapters may be supported through each of PCI I/O adapters 128–129. In this manner, data processing system 100 allows connections to multiple network computers. Each of PCI-to-PCI bridges 116–117, 124–125, 142–143, and 132 is connected to a single I/O adapter.

A memory mapped graphics adapter 148 may be connected to I/O bus 112 through PCI Host Bridge 140 and PCI-to-PCI Bridge 142 via PCI buses 141 and 144 as depicted. A hard disk 150 may also be connected to I/O bus 112 through PCI Host Bridge 140 and PCI-to-PCI Bridge 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access passthrough logic 194 and PCI-to-PCI Bridge 132. The ISA bus access passthrough logic 194 forwards PCI accesses destined to the PCI/ISA bridge 193. The NV-RAM storage is connected to the ISA bus 196. The Service processor 135 is coupled to the service processor mailbox interface 194 through its local PCI bus 195.

Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. Service processor 135 is responsible for saving and reporting error information related to all the monitored items in data processing system 100. Service processor 135 also takes action based on the type of errors and defined thresholds.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
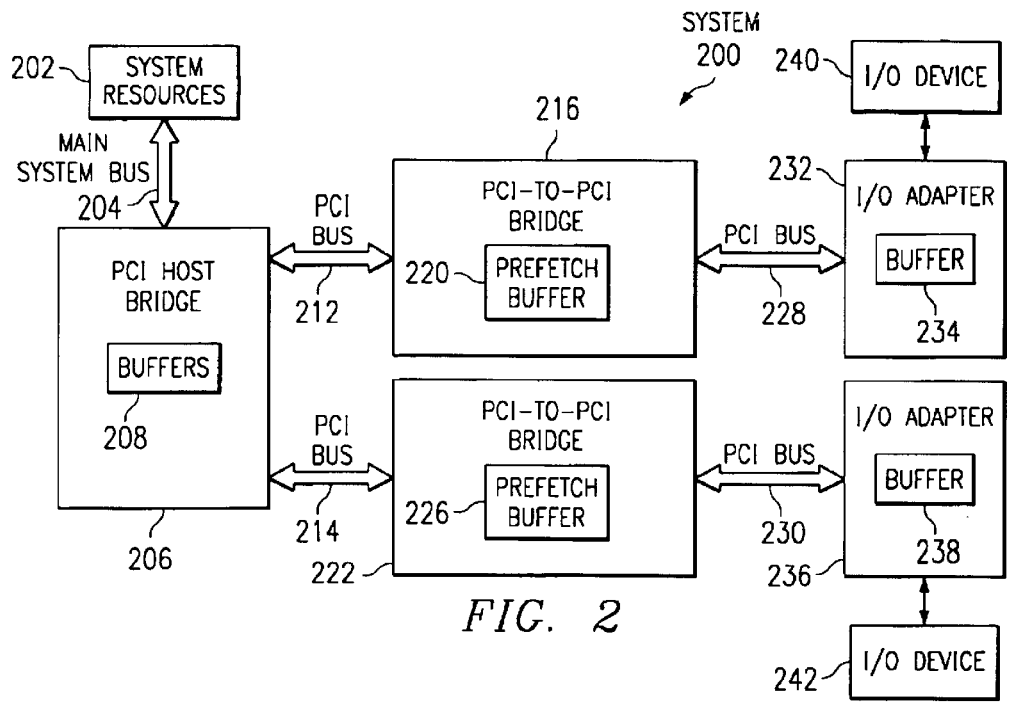
FIG. 2 depicts a block diagram illustrating PCI host bridge and PCI-to-PCI bridge system in accordance with the present invention.

With reference now to FIG. 2, a block diagram illustrating PCI host bridge and PCI-to-PCI bridge system is depicted in accordance with the present invention. System 200 may be implemented as data processing system 100 in FIG. 1. System 200 shows, in greater detail, the functioning of a PCI host bridge, PCI-to-PCI bridge, and I/O adapter system within a data processing system, such as, for example, data processing system 100 in FIG. 1.

System 200 includes PCI Host Bridge 206, PCI-to-PCI bridges 216 and 222, I/O adapters 232 and 236, I/O devices 240–242, and system resources 202. System resources 202 may include a processing unit and system memory as well as other resources that may be found in a data processing system. PCI Host Bridge 206 is connected to system resources 202 through main system bus 204. PCI Host Bridge 206 is connected to each of PCI-to-PCI bridges 216 and 222 through a respective one of PCI buses 212–214. Each of PCI-to-PCI bridges 216 and 222 is connected to a respective one of I/O adapters 232 and 236 through a respective one of PCI buses 228–230. Each of I/O adapters 232 and 236 is connected to a respective one of I/O devices 240–242.

PCI Host Bridge 206, which may be implemented as, for example, one of PCI Host Bridges 114, 122, 130, or 140 in FIG. 1, contains a built in mechanism well known in the art for determining when data becomes stale (i.e. whether the data has been altered by system memory). When one of I/O devices 240 and 242 requests data, this request is sent through I/O adapters 232 and 236 to its respective PCI-to-PCI Bridge 216 and 222. The respective one of PCI-to-PCI Bridges 216 and 222 prefetches the data from system resources 202 and caches (stores) the data in its prefetch buffer 220 and 226. The data is then sent to the respective I/O adapter 232 and 236 which stores the data in its respective buffer 234 and 238. The respective buffers 234 and 238 may not be able to store the same amount of data as the respective one of prefetch buffers 220 and 226. However, since the data is cached in a respective one of prefetch buffers 220 and 226, when the respective one of I/O adapters 232 and 236 is ready for the next portion of the requested data, rather than refetching the data from the system resources, the respective one of prefetch buffers 216 and 222 may simply retrieve the next portion of the requested data from the prefetch buffer 220 and 226 and send the data to the respective one of I/O adapters 232 and 236. Thus, unnecessary traffic on the main system bus 206 is avoided. Furthermore, the performance of the PCI-to-PCI bridges 216 and 222 are also improved since thrashing on the PCI buses 212 and 214 is reduced.

In order to ensure that the current cached data in the prefetch buffers 216 and 222 is not stale, a PHB sideband signal is sent from the PHB Host Bridge 206 to each of PCI-to-PCI Bridges 216 and 222 providing an indication to each PCI-to-PCI bridge 216 and 222 as to whether the data in a respective buffer 216 and 222 is stale. If the indication is that the data in the buffer 216 or 222 is stale, then the respective PCI-to-PCI bridge 216 and 222 discards all the data from its buffers immediately unless the data in the buffers 216 or 222 is currently being read by a corresponding one of I/O adapters 232 and 236. Thus, when the I/O adapter 232 or 236 requests more data, any data in the buffers will be assumed not to be stale and, if the requested data is currently contained in the buffers, that data will be sent to the respective one of I/O adapters 232 and 236. If the requested data is not contained within the respective one of buffers 216 and 222, then the data will be fetched from system memory and cached in the respective one of buffers 216 and 222 as well as sent to the requesting one of I/O adapters 232 and 236.

In another embodiment, rather than discarding the entire contents of the cached data from the respective buffer 220 and 226 of a respective PCI-to-PCI Bridge 216 and 222, the side band signal is a series of signals that indicate which pages cached in the respective PCI-to-PCI Bridge 216 and 222 are stale. Then, the appropriate one of PCI-to-PCI Bridges 216 and 222 discards only those pages within the cached memory buffers 220 or 226 that is stale. These buffers remain empty until a new I/O request for data is received, at which time, the a appropriate data is retrieved from system memory if not contained in one of the other buffers within the appropriate one of buffers 220 and 226, and then cached in the respective one of buffers 220 and 226 as well as sent to the requesting one of I/O adapters 232 and 236. Alternatively, fresh data corresponding to the stale data in the buffers of buffers 220 and 226 that was discarded can be retrieved as soon as the respective buffers within one buffers 220 and 226 are cleared and then placed into those buffers that had previously contained the stale data. The signals received by either of PCI-to-PCI bridges 216 and 222 from the PHB 206 are asynchronous with requests that may be received from I/O adapters 232 and 236.

The PCI-to-PCI bridge could support both the embodiment in which the entire buffer were cleared and the embodiment in which only portions of the data are cleared. For example, a register setting could be in placed in the PCI-to-PCI bridges 216 and 222 and PHB 206 to support both methods. For example, there could be two signals, where, for example, a "00" signal means do nothing as the data is not stale, a "11" signal means flush all buffers whenever the data becomes stale, and a "01" signal means flush only the buffers that are listed in the PCI transaction as being stale. In this manner, a PCI-to-PCI bridge that supports both methods may be used in conjunction with a PCI-to-PCI bridge that supports only one method by configuring the PCI-to-PCI bridge that supports both methods to utilize the appropriate method that corresponds to the method for which the second PCI-to-PCI bridge is configured. If one of the I/O adapters 232 and 236 requests new data that is not currently cached in the appropriate one of prefetch buffers 220 and 222, then the appropriate one of PCI-to-PCI Bridges 216 and 222 discards the data from its buffer 220 or 222 and fetches the new data. The new data is then cached in the appropriate one of prefetch buffers 220 and 226 and a portion or all of it sent to the requesting one of I/O adapters 232 and 236.

Those of ordinary skill in the art will appreciate that the hardware depicted in FIG. 2 may vary. For example, more PCI Host Bridges than depicted may be utilized. Furthermore, more than two PCI-to-PCI Bridges may be connected to each PCI Host Bridge. However, each additional PCI-to-PCI bridge should only be connected to a single I/O adapter, similar to the PCI-to-PCI bridges depicted in FIG. 2. The depicted example is not meant to imply architectural limitations with respect to the present invention.

Figure 3:
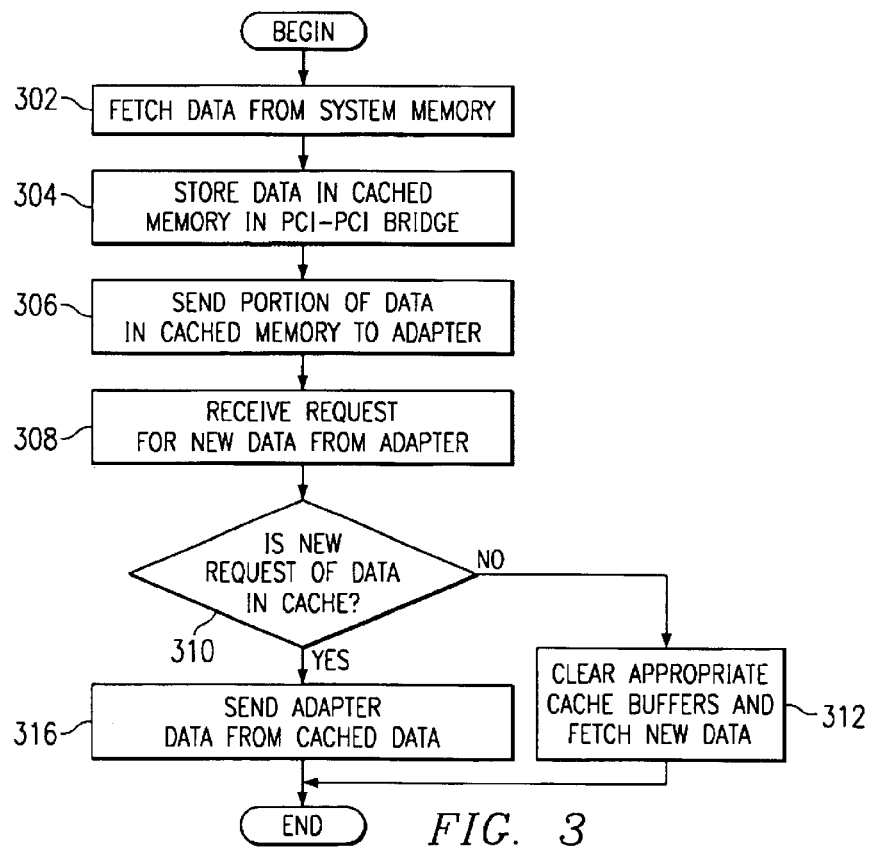
FIG. 3 depicts a flowchart illustrating an exemplary method of providing data to an I/O adapter from a PCI-to-PCI bridge in accordance with the present invention.

With reference now to FIG. 3, a flowchart illustrating an exemplary method of providing data to an I/O adapter from a PCI-to-PCI bridge is depicted in accordance with the present invention. Once a request is received from an I/O adapter to retrieve data from system memory, the PCI-to-PCI bridge fetches the data from system memory (step 302) and stored the data in a cached memory, such as, for example, prefetch buffer 220 depicted in FIG. 2, within the PCI-to-PCI bridge (step 304). The PCI-to-PCI bridge then sends a portion of the data in the cached memory to the requesting adapter (step 306). The portion of data sent to the adapter is at determined by the size of the adapter's buffer.

The PCI-to-PCI adapter then receives a request for more data from the I/O adapter (step 308). The request may be for some of the remaining data in the cached memory of the PCI-to-PCI adapter or maybe for new data, thus, the PCI-to-PCI adapter must determine whether the requested data is contained within the cached memory (step 310). If the newly requested data is not within the cached data, then a sufficient number of buffers are cleared within the cache memory if necessary to hold the requested data, the new data fetched, and sent to the requesting I/O adapter (step 312).

If the newly requested data is within the cached memory, then the PCI-to-PCI assumes that the data is not stale, since otherwise, it would have been cleared, and sends the requested data to the I/O adapter using the cached data (step 316).

Figure 4:
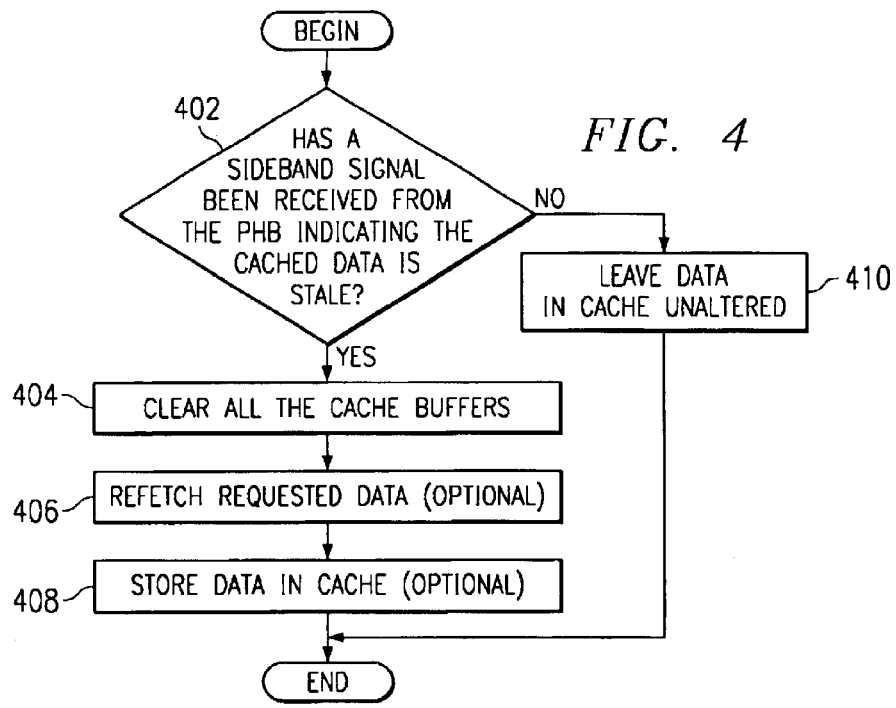
FIG. 4 depicts a flowchart illustrating an exemplary method of determining whether the data in the cache of the PCI-to-PCI bridge is stale in accordance with the present invention.

With reference now to FIG. 4, a flowchart illustrating an exemplary method of determining whether the data in the cache of the PCI-to-PCI bridge is stale is depicted in accordance with the present invention. The PCI-to-PCI bridge must determined whether a sideband signal has been received from the PHB indicating that the cached data is stale (step 402). This sideband signal may be a signal that is received periodically by the PCI-to-PCI bridge, where, for example, a 0 indicates that data is not stale and a 1 indicates the data is stale, or may be a signal that is received only when the PHB determines that the data in the PCI-to-PCI bridge's cache has become stale. If the PCI-to-PCI bridge has not received an indication that the cached data is stale, then the PCI-to-PCI bridge leaves the data in the cached memory unaltered (step 410).

If the PCI-to-PCI bridge has received a sideband signal indicating that the data is stale, then the PCI-to-PCI bridge clears all of its cache buffers (step 404) and, optionally, fetches the fresh version of the requested data to retrieve the current version of the data (step 406). The newly retrieved data is then stored in the PCI-to-PCI bridge's cache (step 408).

Figure 5:
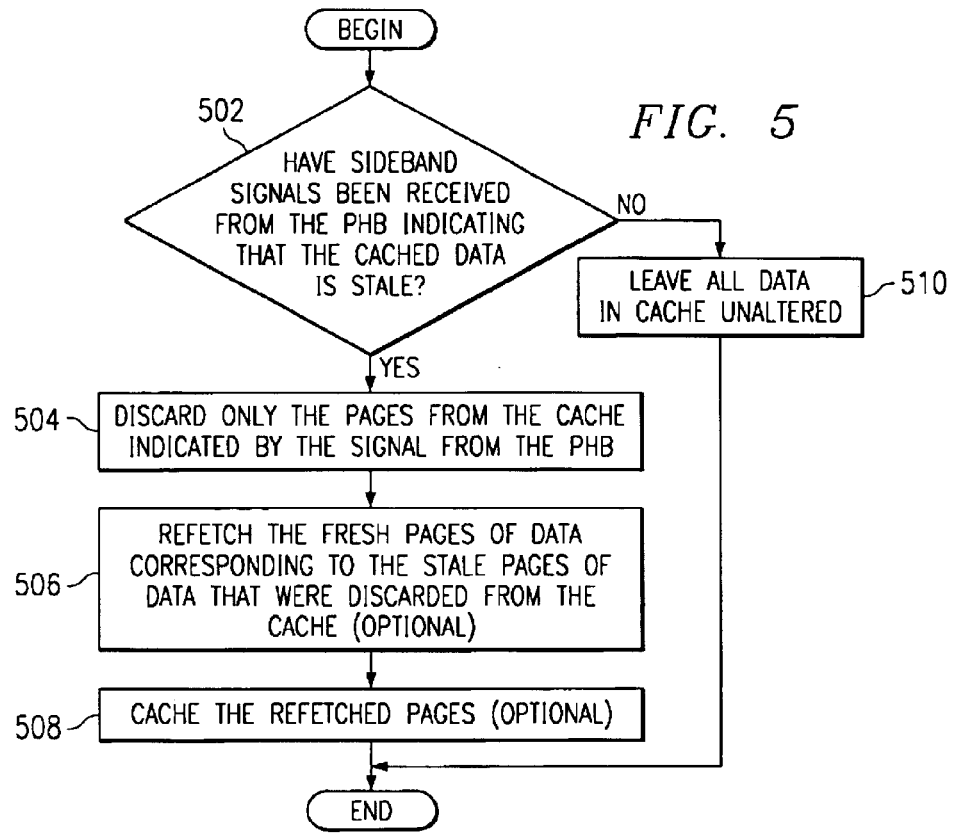
FIG. 5 depicts a flowchart illustrating an exemplary method of determining whether the cached data within a PCI-to-PCI bridge is stale in accordance with an alternative embodiment of the present invention.

With reference now to FIG. 5, a flowchart illustrating an exemplary method of determining whether the cached data within a PCI-to-PCI bridge is stale is depicted in accordance with an alternative embodiment of the present invention. In this embodiment, rather than clearing the entire cache if part of the data is stale, only the portions of the data that are determined to be stale are cleared, leaving the remaining cached data untouched. Thus, the PCI-to-PCI bridge must continually determine whether sideband signals have been received from the PHB indicating that portions of the cached data is stale (step 502). Again, as before, if no sideband signals have been received indicating that any portion of the current cached data is stale, then the data in the cached memory is left unaltered (step 512).

If sideband signals have been received indicating that a portion of the cached data is stale, then the PCI-to-PCI bridge discards only those pages form the cache that are stale as indicated by the sideband signals received from the PHB (step 504). The PCI-to-PCI bridge then, optionally refetches the appropriate pages (or portions) of data corresponding to the fresh versions of the data that have been determined be stale and that were discarded from the cache (step 506). The refetched pages (or portions of data) or then stored in the PCI-to-PCI bridge's cache memory (step 508).

Although the present invention has been described primarily with reference to clearing the buffers and refetching data as the data is requested, the buffers could be cleared as it is determined that the data contained within the buffers is stale. The fresh version of the data could then be refetched prior to receiving a request from an I/O adapter. However, by refetching the data prior to receiving a request, unnecessary bus traffic may be created since the I/O adapter may request new data that is not in the cache. Thus, fresh data would have been retrieved unnecessarily. Also, it should be noted, that although the present invention has bee described primarily with reference to using side band signals to inform the PCI-to-PCI bridge as to whether its cached data is stale, other types of signals and methods may be used as well.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for ensuring that data in a cached memory within a peripheral component interconnect to peripheral component interconnect bridge is fresh, the method comprising:

monitoring signals from a host bridge for an indication of the state of the data in the cached memory within the peripheral component interconnect to peripheral component interconnect bridge; and responsive to a determination that data in a portion of the cached memory is stale, clearing at least the portion of the cached memory containing the stale data.

2. The method as recited in claim 1, further comprising:

retrieving updated data corresponding to the stale data; and storing the updated data in the cached memory.

3. The method as recited in claim 1, wherein the signals are sideband signals.

4. The method as recited in claim 1, wherein the signals indicate which pages within the cached memory are stale, and only those pages within the cached memory that are stale are discarded.

5. The method as recited in claim 1, wherein the step of clearing at least a portion of the cached memory comprises clearing the entire contents of the cached memory.

6. The method as recited in claim 1, where the host bridge is a peripheral component interconnect host bridge.

7. A method of providing data to an I/O adapter from a peripheral component interconnect to peripheral component interconnect bridge, the method comprising:

receiving a request for data from the I/O adapter;

responsive to a determination that the requested data is contained in a cached memory within the peripheral component interconnect to peripheral component interconnect bridge, providing the requested data using the data in the cached memory.

8. The method as recited in claim 7, further comprising:

responsive to a determination that the requested data is not contained within the cached memory, retrieving the requested data from a system memory;

storing the data received from the system memory in the cached memory; and providing at least a portion of the data received from the system memory to the requesting I/O adapter.

9. A peripheral component interconnect to peripheral component interconnect bridge, comprising:

an interface for sending and receiving data from a PCI host bridge;

an interface for sending and receiving data from an input/output adapter; buffers for storing data;

an interface for receiving signals from the PCI host bridge indicating whether data in the buffers are stale; and logic for clearing stale data from the buffers and retrieving fresh data from the PCI host bridge.

10. The peripheral component interconnect to peripheral component interconnect bridge as recited in claim 9, further comprising:

an interface for receiving signals from the PCI host bridge selecting one of a plurality of modes for handling stale data in the peripheral component interconnect to peripheral component interconnect bridge.

11. The peripheral component interconnect to peripheral component interconnect bridge as recited in claim 10, wherein the one of a plurality of modes comprises a mode in which all the data in the buffers is cleared in response to a signal received from the PCI host bridge indicating that at least some of the data in the buffers is stale.

12. The peripheral component interconnect to peripheral component interconnect bridge as recited in claim 10, wherein the one of a plurality of modes comprises a mode in which only the portion of the buffers for which the data has been determined to be stale are cleared.

13. The peripheral component interconnect to peripheral component interconnect bridge as recited in claim 10, wherein the one of a plurality of modes comprises a mode in which the cached data is always refreshed prior to delivering requested data to the input/output adapter in response to a request for data.

14. A computer program product in a computer readable media for use in a data processing system for ensuring that data in a cached memory within a peripheral component interconnect to peripheral component interconnect bridge is fresh, the computer program product comprising:

first instructions for monitoring signals from a host bridge for an indication of the state of the data in the cached memory within the peripheral component interconnect to peripheral component interconnect bridge; and second instructions, responsive to a determination that data in a portion of the cached memory is stale, for clearing at least the portion of the cached memory containing the stale data.

15. The computer program product as recited in claim 14, further comprising:

third instructions for retrieving updated data corresponding to the stale data; and fourth instructions for storing the updated data in the cached memory.

16. The computer program product as recited in claim 14, wherein the signals are sideband signals.

17. The computer program product as recited in claim 14, wherein the signals indicate which pages within the cached memory are stale, and only those pages within the cached memory that are stale are discarded.

18. The computer program product as recited in claim 14, wherein the second instructions comprise clearing the entire contents of the cached memory.

19. A computer program product in a computer readable media for use in a data processing system for providing data to an I/O adapter from a peripheral component interconnect to peripheral component interconnect bridge, the computer program product comprising:

first instructions for receiving a request for data from the I/O adapter;

second instructions, responsive to a determination that the requested data is contained in a cached memory within the peripheral component interconnect to peripheral component interconnect bridge, for providing the requested data using the data in the cached memory.

20. The computer program product as recited in claim 19, further comprising:

third instructions, responsive to a determination that the requested data is not contained within the cached memory, for retrieving the requested data from a system memory;

fourth instructions for storing the data received from the system memory in the cached memory; and fifth instructions for providing at least a portion of the data received from the system memory to the requesting I/O adapter.

21. A system for ensuring that data in a cached memory within a peripheral component interconnect to peripheral component interconnect bridge is fresh, the system comprising:

first means for monitoring signals from a host bridge for an indication of the state of the data in the cached memory within the peripheral component interconnect to peripheral component interconnect bridge; and second means, responsive to a determination that data in a portion of the cached memory is stale, for clearing at least the portion of the cached memory containing the stale data.

22. The system as recited in claim 21, further comprising:

third means for retrieving updated data corresponding to the stale data; and fourth means for storing the updated data in the cached memory.

23. The system as recited in claim 21, wherein the signals are sideband signals.

24. The system as recited in claim 21, wherein the signals indicate which pages within the cached memory are stale, and only those pages within the cached memory that are stale are discarded.

25. The system as recited in claim 21, wherein the second means comprise clearing the entire contents of the cached memory.

26. A system for providing data to an I/O adapter from a peripheral component interconnect to peripheral component interconnect bridge, the system comprising:

first means for receiving a request for data from the I/O adapter;

second means, responsive to a determination that the requested data is contained in a cached memory within the peripheral component interconnect to peripheral component interconnect bridge for providing the requested data using the data in the cached memory.

27. The system as recited in claim 26, further comprising:

third means, responsive to a determination that the requested data is not contained within the cached memory for retrieving the requested data from a system memory;

fourth means for storing the data received from the system memory in the cached memory; and fifth means for providing at least a portion of the data received from the system memory to the requesting I/O adapter.

\* \* \* \* \*